United States Patent [19]

Wanner et al.

[11] 4,208,058
[45] Jun. 17, 1980

[54] SHAFT SEAL

[75] Inventors: Karl Wanner, Echterdingen; Wolfgang Schmid, Plattenhardt; Martin Hölzel, Riedenberg, all of Fed. Rep. of Germany

[73] Assignee: Robert Bosch GmbH, Stuttgart, Fed. Rep. of Germany

[21] Appl. No.: 881,508

[22] Filed: Feb. 27, 1978

[30] Foreign Application Priority Data

Apr. 27, 1977 [DE] Fed. Rep. of Germany ...... 2718659

[51] Int. Cl.² .............................................. F16J 15/32
[52] U.S. Cl. ................................................. 277/153
[58] Field of Search ................ 277/152, 153, 157, 134

[56] References Cited

U.S. PATENT DOCUMENTS 3,938,813  2/1976  Forch ................................. 277/134
4,083,567  4/1978  Thumm ............................... 277/153

Primary Examiner—Robert I. Smith
Attorney, Agent, or Firm—Michael J. Striker

[57] ABSTRACT

A shaft seal for a rotatable shaft which is surrounded by a substantially rigid structural element, has a ring-shaped body portion adapted to be supported by the structural element and having an axis and two axially spaced end faces, a radially displaceable ring-shaped inner portion located radially inwardly of the body portion, extending in an axial direction, and together with the body portion forming an axially extending gap, at least one sealing lip provided in the inner portion and subjected to radial vibrations during rotation of the shaft which vibrations are transmitted to the radially displaceable inner portion and displace the latter, and elements for damping radial vibrations of the sealing lip.

23 Claims, 6 Drawing Figures

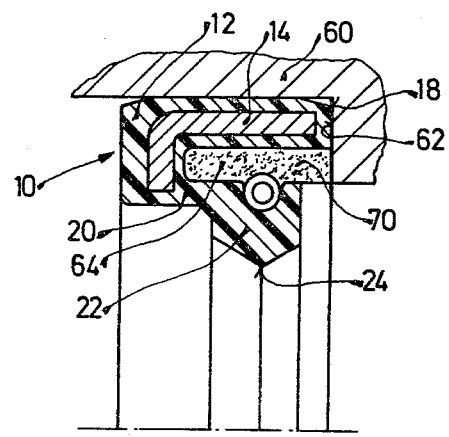
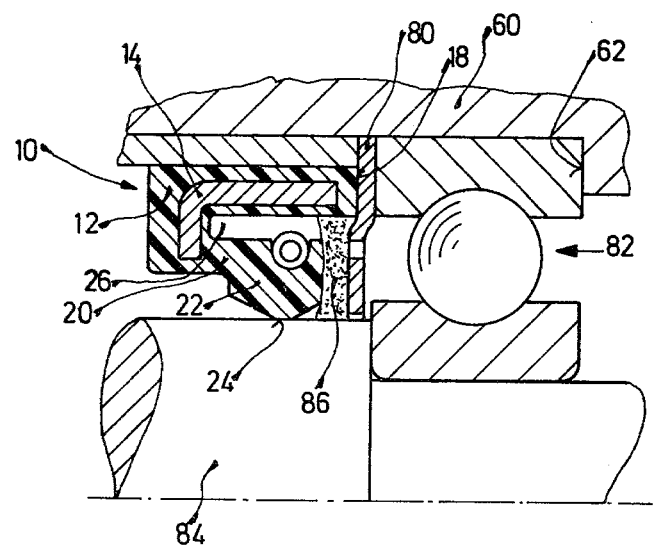

4,208,058

SHAFT SEAL

BACKGROUND OF THE INVENTION

The present invention relates to a shaft seal. More particularly, it relates to a shaft seal for a rotatable shaft surrounded by a substantially rigid structural element.

Shaft seals have been proposed in the art, wherein when the shaft rotates with a great number of revolutions or the shaft drily rotate in sealing lips, so-called "stick-slip" effect takes place, as a result of which effect the sealing lips are radially displaced under the action of radial vibrations. These vibrations are connected with an unpleasant whistling sound, and in certain cases can progressively increase so that the sealing lips or the shaft seal will be destroyed when inherent damping capability of an element which urges the sealing lips toward the shaft cannot longer limit the above-mentioned vibrations.

SUMMARY OF THE INVENTION

Accordingly, it is an object of the present invention to provide a shaft seal which avoids the disadvantages of the prior art.

More particularly, it is an object of the present invention to provide a shaft seal whose vibrations are limited to a permissible magnitude or eliminated at all.

In keeping with these objects, and with others which will become apparent hereinafter, one feature of the present invention, briefly stated, resides in a shaft seal for a rotatable shaft including a ringshaped body portion and a radially displaceable ringshaped inner portion located radially inwardly of the body portion and together with the latter forming a gap, wherein means for damping radial vibrations of sealing lips arranged at the inner portion is provided. When the above-mentioned damping means is provided in the shaft seal, vibrations of the sealing lip generated during rotation of the shaft and transmitted to the radially displaceable inner portion of the shaft seal are limited so that they are retained within permissible limits or eliminated at all.

Another feature of the present invention is that the gap between the body portion and the inner portion has a width which is smaller than a distance by which the inner portion is displaced under the action of the vibrations of the sealing lip. When the gap is so dimensioned, an inner section of the body portion located adjacent to and facing toward the inner portion of the shaft seal, forms the above-mentioned damping means.

Still another feature of the present invention is that the body portion may be formed as a separate member connected with the inner portion. In this case, the separate member serves as the damping means. The separate member may be constituted by a synthetic plastic material.

An additional feature of the present invention is that the damping means may include a damping element which is located in the gap between the body portion and the inner portion. The damping element may be constituted by an elastomeric material.

A still additional feature of the present invention is that the damping means may be formed by a stationary element abutting against the face of the sealing lip which is axially spaced from the region wherein the body portion is connected with the inner portion of the shaft seal.

A further feature of the present invention is that the stationary element may be located between a shoulder of a structural element surrounding the shaft and respective faces of the body portion and the sealing lip.

Finally, a still further feature of the present invention is that an additional sheet of an absorbent material may be located between the stationary element and the respective faces of the body portion and the sealing lip, which absorbent material may be impregnated by a viscous lubricant. It is also possible that the above-mentioned damping element located in the gap between the body portion and the inner portion may be constituted by an absorbent material which is impregnated by a viscous lubricant.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 5 is a view showing a section of a portion of a shaft seal in accordance with an additional embodiment of the present invention wherein damping means is formed by an element of an absorbent material located in a gap between the outer ring-shaped body portion and the inner ring-shaped body portion of the shaft seal; and FIG. 6 is a view showing a section of a portion of a shaft seal in accordance with a still additional embodiment of the present invention, wherein damping means is formed by a friction disc abutting against a face of the outer ring-shaped body portion, and wherein an additional sheet of an absorbent material is located between the friction disc and a face of the sealing lip of the shaft seal.

DESCRIPTION OF THE PREFERRED EMBODIMENTS

Figure 1:
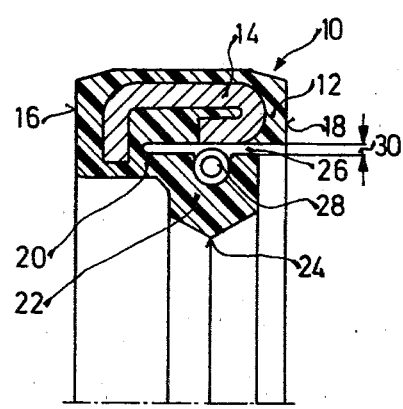
FIG. 1 is a view showing a section of a portion of a shaft seal in accordance with the present invention wherein damping means is formed by an outer ring-shaped body portion of the seal.

A shaft seal 10 shown in FIG. 1 has a ring-shaped body portion 12 which is reinforced by a metal ring 14. The ring-shaped body portion 2 has two axially spaced ends faces 16 and 18. A ring-shaped inner portion 20 is located radially inwardly of the body portion 12 and connected with the latter in the region adjacent to the end face 16. The inner portion 20 extends in the direction from the end face 16 toward the end face 18 of the body portion 12 over an axial distance corresponding to at least a part of the axial length of the body portion 12. The inner portion 20 is radially displaceable relative to the body portion 12.

A sealing lip 22 is provided in the inner portion 20 and has a sealing edge 24 facing toward a shaft to be sealed. In operation the sealing edge 24 of the sealing lip 22 abuts against the shaft. The sealing lip 22 is located closer to the end face 18 of the body portion 12 than a region wherein the inner portion 20 is connected with the body portion 12. An annular gap 26 is formed between the body portion 12 and the inner portion 20 or the lips 22, which annular gap extends in the axial direction and is open at the face 18 of the body portion 12. The sealing lip 22 has a groove provided in a surface facing toward the body portion 12, in which groove an element is located operative for urging the sealing edge 24 of the sealing lip 22 toward the shaft. A worm spring 28 can be utilized as such urging element. The inner gap 26 has a radial width 30 which corresponds to maximum magnitude of permissible vibrations of the sealing lip 22. In this case surfaces of the worm spring 28 or the sealing lip 22 facing toward the body portion 12 abut against a surface of the body portion 12 facing toward the inner portion, so that the vibrations of the sealing lip 22 and the inner portion 20 are limited by a section of the body portion 12 adjacent to the gap 26. Since the vibrations cannot exceed a predetermined magnitude, the above-mentioned destruction of the sealing lip is prevented.

Figure 2:
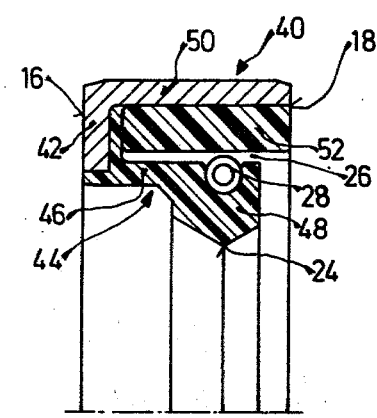
FIG. 2 is a view showing a section of a portion of a shaft seal in accordance with another embodiment of the present invention.

FIG. 2 shows a shaft seal in accordance with another embodiment of the present invention. In this shaft seal a body portion is formed by a metal ring 40 having an angular cross-section. A separate ring-shaped element 52 is located radially inwardly of the ring 40. An inner portion 44 having a transition region 46 is connected to a radial leg 42 of the ring 40. The inner portion 44 is provided with a sealing lip 48 which has the sealing edge 24. The locations of the sealing lip 48 and the transition region 46 relative to the end faces 16 and 18 of the ring 40 are similar to those of the shaft seal shown in FIG. 1. The urging element 28 is also located in a groove provided in the sealing lip 48.

The separate ring-shaped element 52 which is located between an axial leg 50 of the ring 40, together with the inner portion 44 forms the annular gap 26. A width of the annular gap 26 is so selected that the separate ring-shaped member 52 serves as damping means for damping the radial vibrations of the sealing lip 48 and the inner portion 44. The ring 52 is constituted by a deformable material which possesses high damping characteristics, such as an elastomeric material. In certain cases it can be advantageous with the ring-shaped member 52 is constituted by a relatively hard undeformable material.

Figure 3:
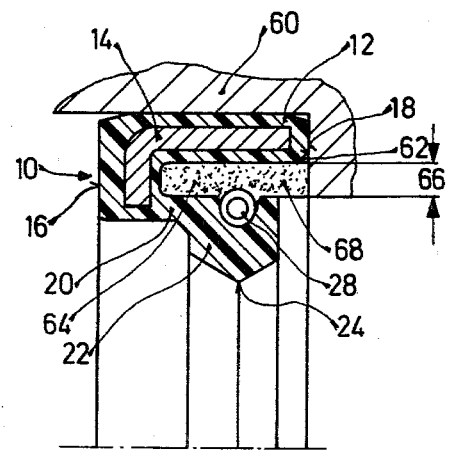
FIG. 3 is a view showing a section of a portion of a shaft seal in accordance with a further embodiment of the present invention, wherein damping means is formed by a damping element located in a gap between the outer ring-shaped body portion and an inner portion of the shaft seal.

In accordance with the embodiment shown in FIG. 3, the shaft seal 10 is arranged in a structural element 60 surrounding the shaft to be sealed. The end face 18 of the shaft seal 10 abuts against a shoulder 62 of the structural element 60. As can be seen from FIG. 3, an annular gap 64 which is formed between the body portion 12 and the radially displaceable inner portion 12 have a width 66 which exceeds the width 30 of the gap 26 of the shaft seal shown in FIGS. 1 and 2. A filling insert 68 of a damping material, such as an elastomeric material, is inserted into the thus-enlarged annular gap 64.

The shaft seal in accordance with the embodiment shown in FIG. 5 substantially corresponds to that shown in FIG. 3. However, a filling insert 70 located in the annular gap 64 of the shaft seal shown in FIG. 5 is constituted by an absorbent material, preferably felt. The filling insert 70 is impregnated by a lubricant which issues from the filling insert when the sealing lip 22 vibrates. The lubricant flows over an outer side of the sealing lip up to the sealing edge 24 of the latter, so that this lubricant breaks off the vibrations.

Figure 4:
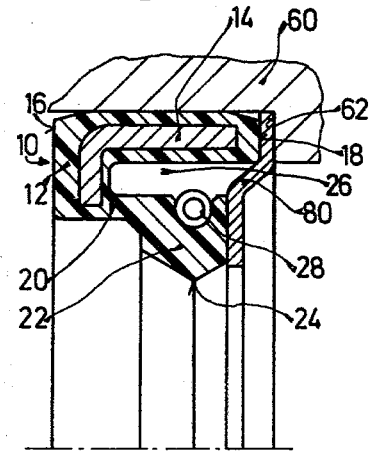
FIG. 4 is a view showing a section of a portion of a shaft seal in accordance with a still further embodiment of the present invention, wherein damping means is formed by a friction disc abutting against faces of the outer ring-shaped body portion and of sealing lip provided in the inner ring-shaped portion.

In the shaft seal in accordance with the embodiment shown in FIG. 4 a ring-shaped disc 80 is provided, which is located between the shoulder 62 of the structural element 60 and the end face 15 of the body portion of the shaft seal. A radially outer portion of the disc 80 abuts against the end face 18 of the body portion, whereas a radially inner portion of the disc 80 abuts against the sealing lip 22. The disc 80 is preferably constituted by metal and has a rough surface abutting against the sealing lip 22, so that the vibrations of the sealing lip are damped under the action of friction between the disc and the sealing lip. The annular gap between the body portion, the sealing lip 22 or the inner portion, and the disc 80 remains, in this embodiment, empty.

The shaft seal in accordance with the embodiment shown in FIG. 6 is, to some extent, similar to the above-mentioned embodiment. However, in the shaft seal shown in this Figure, the ring-shaped disc 80 is located between the shoulder 62 of the structural element 6 and a ball bearing 82 of the shaft. The ball bearing 82 is located between the structural element 60 and a shaft 84. Thus, the disc 80 is held between a face of the ball bearing which faces toward the structural element, and the end face 18 of the body portion 12.

A sheet 86 of an absorbent material which can be constituted by felt similarly to that shown in FIG. 5, is located between the disc 8 and a face of the sealing lip 22 which faces toward the latter. An inner surface of the sheet 86 abuts against an outer surface of the shaft 84. The sheet 86 is also impregnated by a lubricant and contacts the shaft at a location which is close to the sealing edge 24 of the sealing lip 22. Therefore, the region of the shaft which cooperates with the sealing edge 24 is so lubricated that the above-mentioned "stick-slip" effect cannot take place in this case. In the shaft seal in accordance with this embodiment of the invention it is possible to utilize the annular gap 26 as a reservoir of lubricant.

In the shaft seals shown in FIGS. 1–4 the vibrations are maintained within permissible limits. The shaft seals in accordance with the embodiments shown in FIGS. 5 and 6 directly counteract "stick-slip" effect by means of the absorbent element which is impregnated by lubricant. In the shaft seal in accordance with the embodiment shown in FIG. 6, this is performed continuously, whereas in the shaft seal in accordance with the embodiment shown in FIG. 5, lubrication is performed only when the vibrations occur inasmuch as when the sealing lip vibrates the filling insert 70 is squeezed so that the lubricant issues from the latter and flows to the sealing edge 24.

In the known shaft seals inherent characteristics of the shaft seals were not sufficient to maintain the vibrations within permissible limits. In accordance with the present invention, additional damping means is provided, for damping the vibrations of the sealing lip. In accordance with the present invention, the damping means is formed by a corresponding dimensioning of the annular gap 26, by the provision of the damping material 68 in the annular gap 64, by the provision of the ring-shaped disc 80 cooperating with the sealing lip 22, or by the provision of reservoirs of lubricant.

It will be understood that each of the elements described above, or two or more together, may also find a useful application in other types of constructions differing from the types described above.

While the invention has been illustrated and described as embodied in a shaft seal, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A shaft seal for a rotatable shaft which is surrounded by a substantially rigid structural element, comprising a ring-shaped body portion adapted to be supported by the structural element and having an axis, two axially spaced end faces, and an inner surface facing toward the shaft; a radially displaceable ring-shaped inner portion located radially inwardly of said body portion and having an outer surface facing toward said inner surface of said body portion and together with the same forming an axially extending gap, said inner portion being connected with said body portion adjacent one axial end of said gap, said inner portion carrying at least one sealing lip which is urged toward the shaft so as to sealingly abut against the latter and which is subjected to radial vibrations during rotation of the shaft, which vibrations are transmitted to said radially displaceable inner portion and displace the latter; means for urging said one sealing lip toward the shaft; and means for damping radial vibrations of said sealing lip said damping means being separate from said urging means.

2. The shaft seal as defined in claim 1, wherein said urging means includes at least one urging element arranged to urge said inner portion toward said shaft.

3. The shaft seal as defined in claim 1, wherein said lip has an edge facing toward the shaft and sealingly abutting against the latter, when said inner portion is urged toward said shaft.

4. The shaft seal as defined in claim 1, wherein one of said end faces of said body portion is located at the side of said one axial end of said gap, whereas the other end face is located at the axially opposite side, said inner portion being connected with said body portion by a transition section, said sealing lip being spaced from said other end face of said body portion by a distance which is smaller than the distance by which said transition section is spaced from said other end face.

5. The shaft seal as defined in claim 1, wherein said gap is open in the region of its other axial end.

6. The shaft seal as defined in claim 1, wherein one of said end faces of said body portion is located at the side of said one axial end of said gap, whereas the other end face is located at the axially opposite side, said body portion having an axial length, said inner portion extending toward said other face of said body portion by a distance corresponding to at least a part of said axial length of said body portion.

7. The shaft seal as defined in claim 1, wherein said damping means is associated with said radially deformable inner portion.

8. The shaft seal as defined in claim 1, wherein said damping means is associated with said lip of said inner portion.

9. The shaft seal as defined in claim 1, wherein said gap is an annular gap.

10. The shaft seal as defined in claim 1, wherein said body portion is reinforced; and further comprising an element reinforcing said body portion.

11. The shaft seal as defined in claim 1, wherein said body portion has an inner section forming said inner surface thereof, said inner portion being radially outwardly displaceable by a predetermined distance under the action of the vibrations of the sealing lip, said gap between said body portion and said inner portion having a width which is smaller than the distance by which said inner portion is radially outwardly displaced under the action of the vibrations of said sealing lip so that said inner section of said body portion forms said damping means.

12. The shaft seal as defined in claim 1, wherein said body portion is a separate member connected with said inner portion.

13. The shaft seal as defined in claim 12, wherein said separate member is constituted by a synthetic plastic material.

14. The shaft seal as defined in claim 2, wherein said damping means includes a damping element located in said gap between said body portion and said inner portion.

15. The shaft seal as defined in claim 14, wherein said damping element is constituted by an elastomeric material.

16. The shaft seal as defined in claim 1, wherein one of said end faces of said body portion is located at the side of said one axial end of said gap, whereas the other end face is located at the axially opposite side, said sealing lip having a face adjacent to said other face of said inner portion, said damping means being formed by a stationary element abutting against said face of said sealing lip.

17. The shaft seal as defined in claim 16, wherein the structural element surrounding the shaft has a shoulder, said stationary element being located between the shoulder of the structural element, on the one hand, and said other face of said body portion and said face of said sealing lip, on the other hand.

18. The shaft seal as defined in claim 17; and further comprising a sheet of an absorbent material located between said stationary element, on the one hand, and said other face of said body portion and said face of said inner portion, on the other hand, said sheet extending through said gap up to the shaft.

19. The shaft seal as defined in claim 18, wherein said sheet is constituted by felt.

20. The shaft seal as defined in claim 18, wherein said sheet of an absorbent material is impregnated by a viscous lubricant.

21. The shaft seal as defined in claim 1, wherein said damping means includes an element of an absorbent material located in said gap between said body portion and said inner portion.

22. The shaft seal as defined in claim 21, wherein said element of an absorbent material is impregnated by a viscous lubricant.

23. The shaft seal as defined in claim 2, wherein said urging element is arranged in said inner portion.

* * * * *